United States Patent
Fan et al.

(10) Patent No.: US 10,154,491 B2
(45) Date of Patent: Dec. 11, 2018

(54) METHOD AND APPARATUS FOR SIGNALING OF UL-DL CONFIGURATION

(71) Applicant: Telefonaktiebolaget L M Ericsson (publ), Stockholm (SE)

(72) Inventors: Rui Fan, Beijing (CN); Zhiheng Guo, Beijing (CN); Shaohua Li, Beijing (CN); Jinhua Liu, Beijing (CN); Xinghua Song, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 15 days.

(21) Appl. No.: 14/911,047

(22) PCT Filed: Jun. 13, 2014

(86) PCT No.: PCT/CN2014/079823
§ 371 (c)(1),
(2) Date: Feb. 9, 2016

(87) PCT Pub. No.: WO2015/021818
PCT Pub. Date: Feb. 19, 2015

(65) Prior Publication Data
US 2016/0183262 A1    Jun. 23, 2016

Related U.S. Application Data (63) Continuation of application No. PCT/CN2013/081427, filed on Aug. 14, 2013.

(51) Int. Cl.
*H04W 72/04* (2009.01)

(52) U.S. Cl.
CPC ..... *H04W 72/0453* (2013.01); *H04W 72/042* (2013.01)

(58) Field of Classification Search
CPC .................. H04W 72/0453; H04W 72/042
(Continued)

(56) References Cited

U.S. PATENT DOCUMENTS 9,008,014 B2 * 4/2015 Choi ............... H04L 1/1861
370/329
2011/0134774 A1 * 6/2011 Pelletier ........... H04W 52/365
370/329
(Continued)

FOREIGN PATENT DOCUMENTS

CN    101505498 A    8/2009
CN    101516140 A    8/2009
(Continued)

OTHER PUBLICATIONS

3GPP TSG RAN WG1 Meeting #73; Fukuoka, Japan; Title: RAN1 Chairman's Notes—May 20-24, 2013.
(Continued)

*Primary Examiner* — Christine Ng
(74) *Attorney, Agent, or Firm* — Baker Botts, LLP (57) ABSTRACT

Methods and apparatuses for transmitting information of uplink-downlink (UL-DL) configuration in presence of carrier aggregation are provided. The method comprises: in response to a decision of transmitting the information of UL-DL configuration, determining one or more component carriers to carry the information of UL-DL configuration based on a predefined rule; and transmitting a message, including the information of UL-DL configuration, on the determined one or more component carriers. Corresponding apparatuses are also provided.

20 Claims, 4 Drawing Sheets

(58) Field of Classification Search
USPC .................. 370/328, 329, 338, 401, 465
See application file for complete search history.

(56) References Cited

U.S. PATENT DOCUMENTS

| | | | | |
|---|---|---|---|---|
| 2013/0182675 A1* | 7/2013 | Ahn | .................. | H04L 1/1861 370/329 |
| 2013/0242799 A1* | 9/2013 | Yin | .................. | H04L 1/1861 370/254 |
| 2013/0322343 A1* | 12/2013 | Seo | .................. | H04W 24/02 370/328 |
| 2014/0092786 A1* | 4/2014 | He | .................. | H04W 52/0258 370/280 |
| 2014/0269460 A1* | 9/2014 | Papasakellariou | .... | H04L 5/1469 370/294 |
| 2015/0029910 A1* | 1/2015 | He | .................. | H04W 76/02 370/280 |

FOREIGN PATENT DOCUMENTS

| | | |
|---|---|---|
| EP | 3 026 946 | 6/2016 |
| WO | WO 2012 108718 | 8/2012 |

OTHER PUBLICATIONS

PCT Written Opinion of the International Searching Authority for International application No. PCT/CN2014/079823, dated Aug. 25, 2014.

Japanese Office Action for JP Patent Application No. 2016/532214—dated Jan. 24, 2017.

3GPP TSG-RAN WG1 #74; Barcelona, Spain;Title: On efficient transmission of explicit signaling; Source: Ericsson, ST-Ericsson (R1-133417)—Aug. 19-23, 2013.

3GPP TSG RAN WG1 Meeting #74; Barcelona, Spain; Title: Design of L1 Signaling for UL-DL Reconfiguration; Source: CATT (R1-133014)—Aug. 19-23, 2013.

3GPP TSG-RAN WG1 #74; Barcelona, Spain; Title: Signaling Mechanism for TDD UL/DL Reconfiguration; Source: Intel Corporation (R1-132926)—Aug. 19-23, 2013.

3GPP TSG RAN WG1 #74; Barcelona, Spain; Title: Dynamic Signaling for TDD UL/DL Reconfiguration; Source: Texas Instruments (R1-133167)—May 19-23, 2013.

3GPP TSG-RAN WG1 Meeting #74; Barcelona, Spain; Title: on UL-DL Reconfiguration Signalling; Source: NSN, Nokia (R1-133476)—Aug. 19-23, 2013.

Extended European Search Report for Application No./Patent No. 14836757.6-1857 / 3033916 PCT/CN2014079823—dated Apr. 5, 2017.

3GPP TSG RAN WG1 Meeting #74; Barcelona, Spain; Source: LG Electronics; Title: Details of UL-DL Reconfiguration Message (R1-133366)—Aug. 19-23, 2013.

3GPP TSG RAN WG1 Meeting #74; Barcelona, Spain; Source: Potevio; Title: On Signalling Mechanism for TDD UL-DL Reconfiguration (R1-133561)—Aug. 19-23, 2013.

* cited by examiner

METHOD AND APPARATUS FOR SIGNALING OF UL-DL CONFIGURATION

PRIORITY

This nonprovisional application is a U.S. National Stage Filing under 35 U.S.C. § 371 of International Patent Application Serial No. PCT/CN2014/079823 filed Jun. 13, 2014, and entitled "Method And Apparatus For Signaling Of UL-DL Configuration" which claims priority to PCT/CN2013/081427 filed on Aug. 14, 2013, both of which are hereby incorporated by reference in their entirety.

TECHNICAL FIELD

Embodiments herein generally relate to communication systems, and more particularly to methods, apparatuses, a user equipment, a base station, and a computer readable storage media for signaling of uplink-downlink (UL-DL) configuration in presence of carrier aggregation (CA).

BACKGROUND

This section introduces aspects that may facilitate a better understanding of the disclosure. Accordingly, the statements of this section are to be read in this light and are not to be understood as admissions about what is in the prior art or what is not in the prior art.

It is envisioned that wireless data traffic will become more and more localized in the future, where most users will be in hotspots, or in indoor areas, or in residential areas. These users will be located in clusters and will produce different uplink (UL) and downlink (DL) traffic at different time. This essentially means that a dynamic feature to adjust the UL and DL resources to instantaneous (or short term) traffic variations would be required in future local area cells. In this case, a Time Division Duplex (TDD) system which has the flexibility to dynamically allocate the UL/DL resources becomes very attractive.

There are seven different TDD UL/DL configurations in Long-Term Evolution (LTE), providing about 40%-90% resources for DL. Faster TDD reconfigurations (referred to "dynamic TDD" henceforth) have shown good performance potentials in both UL and DL especially at low to medium system load and will be a standardized feature of LTE Release 12.

Different signaling methods are being considered to support dynamic TDD reconfigurations with different time scale. In the $3^{rd}$ Generation Partnership Project (3GPP) RN1#73 Chairman's Notes, May 20-24, 2013, an explicit L1 signaling is proposed to support dynamic TDD. With L1 signaling, the link direction of the flexible sub-frame is controlled by the enhanced-NodeB (eNB) and the user equipment (UE) will follow the signaling to judge whether the sub-frame is a downlink or an uplink.

In 3GPP Release 10, carrier aggregation (CA) was introduced to support even higher data rates. LTE-Advanced (LTE-A) aims to support peak data rates of 1 Gbps in the downlink and 500 Mbps in the uplink. In order to fulfill such requirements, a transmission bandwidth of up to 100 MHz is required; however, since the availability of such large portions of contiguous spectrum is rare in practice, LTE-A uses carrier aggregation of multiple Component Carriers (CCs) to achieve high-bandwidth transmission. Release 8 LTE carriers have a maximum bandwidth of 20 MHz, so LTE-A supports aggregation of up to five 20 MHz CCs.

For backward compatibility, each CC appears as a separate cell with its own Cell ID there is one primary CC (PCC, or referred to as primary cell, PCell) configured for each UE, including the primary UL carrier and primary DL carrier. Other carriers configured for the UE are referred as secondary CCs (SCCs, or referred to as secondary cells, SCells). The PCell is defined as the cell that is initially configured during connection establishment; it plays an essential role with respect to security, Non-Access Stratum 2 (NAS2) mobility information, System Information (SI) for configured cells (i.e. carriers), and some lower-layer functions. A SCell is a cell that may be configured after connection establishment, merely to provide additional radio resources.

There are two types of scheduling policies defined:

Backward compatible method (i.e. non-cross-carrier scheduling or self scheduling): as in Release 8, it is possible for a physical dedicated control channel (PDCCH) on each downlink CC to carry downlink resource assignments applicable to the same CC, and uplink resource grants applicable to the associated uplink CC (according to the linkage indicated in System Information Block 2 (SIB2)).

Cross-carrier scheduling method: this enables a PDCCH on one CC to schedule data transmissions on another CC by means of a new 3-bit Carrier Indicator Field (CIF) inserted at the beginning of the PDCCH messages. The rest of the Release 8 PDCCH Control Channel Element (CCE) structure, coding and message are unchanged for carrier aggregation. The presence or absence of the CIF on each CC is configured semi-statically (i.e. by RRC signaling) for each UE. When configured, the CIF is only present in PDCCH messages in the UE-specific search space not the common search space. The UE listens to the downlink assignment and uplink grant over the configured CCs.

Different UEs may be configured with different PCC and SCCs. The configured carriers for downlink assignment and uplink grant transmission can be different.

Considering the high data rate requirement in future, it is naturally that carrier aggregation will be implemented in micro and pico nodes. In case of carrier aggregation, one UE may be served by multiple carriers and different UEs may be served by different carriers. Different UEs may be configured with different Primary Component Carriers (PCC) and Secondary Component Carriers (SCC). Further, different UEs may be configured to monitor the downlink assignments and uplink grants over different carriers. Currently dynamic TDD is being introduced into 3GPP and the claimed main applicable scenario of dynamic TDD is the micro/pico nodes. Thus it is meaningful to propose methods to indicate the UL-DL configuration switch in case of carrier aggregation case.

In 3GPP, explicit physical layer signaling is proposed to be the work assumption, while the signal in case of carrier aggregation case is not mentioned yet. Hence it is meaningful to propose some methods to notify UEs regarding the UL-DL configuration change.

SUMMARY

Therefore, it would be desirable in the art to provide a solution for signaling UL-DL configuration in presence of carrier aggregation.

In a first aspect, a method for transmitting information of uplink-downlink, UL-DL, configuration in presence of carrier aggregation is provided. The method comprises: in response to a decision of transmitting the information of UL-DL configuration, determining one or more component carriers to carry the information of UL-DL configuration based on a predefined rule; and transmitting a message, including the information of UL-DL configuration, on the determined one or more component carriers.

In some embodiments, the predefined rule may comprise one or more of the following: rule A: a primary component carrier, PCC, for a user equipment, UE, is configured to carry the information of UL-DL configuration; rule B: scheduling component carriers which carry resource scheduling commands are configured to carry the information of UL-DL configuration; rule C: each active component carrier is configured to carry its own information of UL-DL configuration; and rule D: a specified component carrier or a specified subset of component carriers is configured to carry the information of UL-DL configuration.

In some further embodiments, in rule A, the PCC of a user equipment is configured to carry the information of UL-DL configuration related to all serving component carriers of the user equipment; in rule B, the scheduling component carrier is configured to carry the information of UL-DL configuration related to scheduled component carriers, or a specified scheduling component carrier of a UE is configured to carry the information of UL-DL configuration related to all component carriers; and in rule D, the specified component carrier is configured to carry the information of UL-DL configuration related to all component carriers, and each component carrier within the specified subset is configured to carry the information of UL-DL configuration related to a specified subset of component carriers.

In some embodiments, the message may comprise any one of the following: UL-DL configurations for component carriers which are to switch UL-DL configuration; UL-DL configurations for all component carriers; and one or more UL-DL configurations, each for a corresponding subset of component carriers.

In some embodiments, the message may comprise any of: a single command aggregated with UL-DL configurations related to all component carriers; a plurality of separate commands, each for the UL-DL configuration for one component carrier; and one or more commands, each including one UL-DL configuration for a corresponding subset of component carriers.

In some embodiments, the decision may be made based on one or more of the following: a UL-DL configuration switch for any component carrier; and a period for notifying UL-DL configuration.

In a second aspect, a method for receiving information of uplink-downlink, UL-DL, configuration in presence of carrier aggregation is provided. The method comprises: determining one or more component carriers for carrying the information of UL-DL configuration based on a predefined rule; detecting a message including the information of UL-DL configuration on the one or more component carriers; and analyzing the message to determine one or more component carriers to switch its UL-DL configuration.

In a third aspect, a base station adapted for transmitting information of uplink-downlink, UL-DL, configuration in presence of carrier aggregation is provided. The base station comprises a processor and a memory, the memory containing instructions executable by the processor whereby the base station is operative to: in response to a decision of transmitting the information of UL-DL configuration, determining one or more component carriers to carry the information of UL-DL configuration based on a predefined rule; and transmitting a message, including the information of UL-DL configuration, on the determined one or more component carriers.

In a fourth aspect, a wireless device adapted for receiving information of uplink-downlink, UL-DL, configuration in presence of carrier aggregation is provided. The wireless device comprises a processor and a memory, the memory containing instructions executable by the processor whereby the wireless device is operative to: determining one or more component carriers for carrying the information of UL-DL configuration based on a predefined rule; detecting a message including said information of UL-DL configuration on said one or more component carriers; and analyzing the message to determine one or more component carriers to switch its UL-DL configuration.

In a fifth aspect, computer program is provided. The computer program comprises instructions which, when executed on at least one processor, cause the at least one processor to carry out the method according to the first aspect or the second aspect of the present disclosure.

In a sixth aspect, a base station adapted for transmitting information of uplink-downlink, UL-DL, configuration in presence of carrier aggregation is provided. The base station comprises: a decision unit, configured to decide to transmit information of uplink-downlink, UL-DL, configuration; a determination unit, configured to determine one or more component carriers to carry the information of UL-DL configuration based on a predefined rule; and a transmitting unit, configured to transmit a message, including the information of UL-DL configuration, on the determined one or more component carriers.

In a sixth aspect, a wireless device adapted for receiving information of uplink-downlink, UL-DL, configuration in presence of carrier aggregation is provided. The wireless device comprises: a determination unit, configured to determine one or more component carriers for carrying the information of UL-DL configuration based on a predefined rule; a detection unit, configured to detect a message including the information of UL-DL configuration on the one or more component carriers; and an analyzing unit, configured to analyze the message to determine one or more component carriers to switch its UL-DL configuration.

In a seventh aspect, a computer-readable storage media having computer program code stored thereon is provided. The computer program code is configured to, when executed, cause an apparatus to perform actions in the method according to the first aspect or the second aspect.

With particular embodiments of the techniques described in this specification, signals and mechanisms regarding dynamic UL-DL configurations are proposed for dynamic TDD in presence of CA. A plurality of signaling schemes are provided for various scenarios.

Other features and advantages of the embodiments herein will also be understood from the following description of specific embodiments when read in conjunction with the accompanying drawings, which illustrate, by way of example, the principles of embodiments.

BRIEF DESCRIPTION OF THE DRAWINGS

The above and other aspects, features, and benefits of various embodiments herein will become more fully apparent, by way of example, from the following detailed description and the accompanying drawings, in which.

DETAILED DESCRIPTION

Hereinafter, the principle and spirit of the present disclosure will be described with reference to the illustrative embodiments. It should be understood, all these embodiments are given merely for the skilled in the art to better understand and further practice the present disclosure, but not for limiting the scope of the present disclosure. For example, features illustrated or described as part of one embodiment may be used with another embodiment to yield still a further embodiment. In the interest of clarity, not all features of an actual implementation are described in this specification.

In the following description, a base station (BS) is an entity for allocating resources to a terminal and can be any of an enhanced Node B (eNB), a Node B, a BS, a radio access unit, a base station controller, and a node on a network. The terminal can be a user equipment (UE), a mobile station (MS), a cellular phone, a smartphone, a computer, or a multimedia system equipped with communication function.

While it is described below in the context of a LTE type cellular network for illustrative purposes and since it happens to be well suited to that context, those skilled in the art will recognize that the embodiments disclosed herein can also be applied to various other types of cellular networks.

Figure 1:
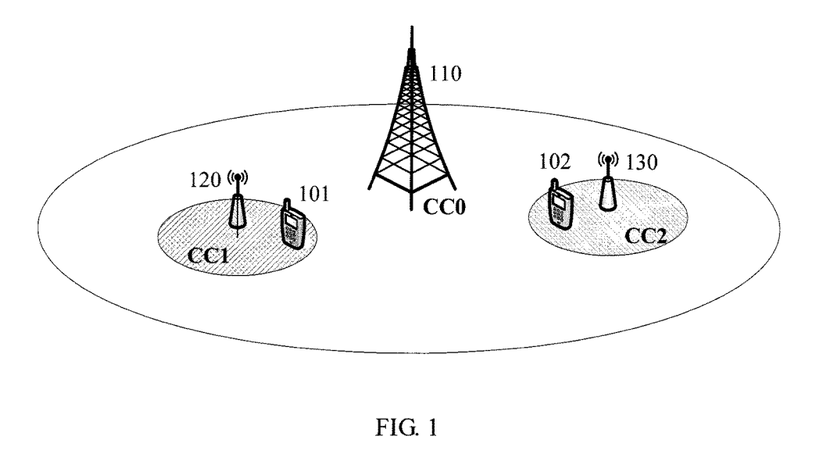
FIG. 1 illustrates an exemplary scenario of dynamic TDD with carrier aggregation where embodiments herein may be applied.

The skilled in the art should appreciate that, with carrier aggregation (CA), various network deployments are possible. FIG. 1 illustrates an exemplary scenario of dynamic TDD with CA where embodiments herein may be applied. Note that in FIG. 1 only three non-collocated CCs, denoted CC0, CC1 and CC2, are assumed. In practice, a smaller or larger number of collocated or non-collocated CCs can be considered as well as deployments with mixed scenarios.

As shown in FIG. 1, a CC (CC0) of a regular eNB 110 provides macro-cell coverage, whereas remote radio head (RRH) cells are placed at traffic hotspots to provide extended throughput by another CC. For example, a RRH 120 provides a pico-cell coverage through a CC (CC1), and a RRH 130 provides a pico-cell coverage through a CC (CC2). RRH cells are connected via optical fibers to the eNB, thereby allowing the aggregation of CCs between the macro-cell and RRH cell based on the same CA framework. Such deployment allows the operator to efficiently improve system throughput by using low-cost RRH equipment.

To operate in CA mode, LTE-A UE first needs to be configured by the serving eNB with multiple serving cells. Among the configured set of serving cells for UE in RRC_CONNECTED state, one of them is designated as the PCell in which the corresponding DL CC is designated as the DL primary CC (PCC), and the corresponding UL CC is designated as the UL PCC. The UE may be configured with one or more additional serving cells, called secondary serving cells (SCells). The DL and UL CCs corresponding to an SCell are called the DL and UL secondary CCs (SCCs), respectively. For each SCell, the usage of a UL SCC by the UE in addition to the DL SCC is configurable by the eNB.

The PCell designation is UE-specific and can be different for different UEs served by the same eNB. In other words, a cell at an eNB may be the PCell for one UE and an SCell for another UE. Normally, the DL and UL PCCs should be robust, and are typically chosen such that they provide the most ubiquitous coverage and/or best overall signal quality. For example, as shown in FIG. 1, a UE 101 is located within the coverage of RRH 110, and another UE 102 is located within the coverage of RRH 120. The PCC of UE 101 is CC1, and the PCC of UE 102 is CC2. Additionally, UE 101 may be configured with a SCC of CC0, and UE 102 may be configured with a SCC of CC0.

According to some embodiments, the UL-DL configurations of UE 101 and UE 102 may be configured dynamically according to the real-time data traffic. In some embodiments, the period for changing UL-DL configuration may be 10 ms or less.

Figure 2:
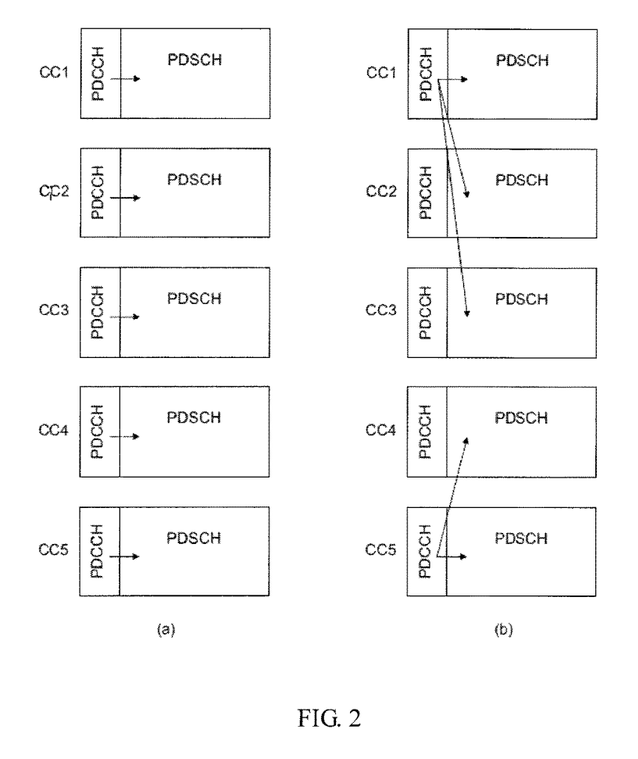
FIG. 2 illustrates examples of semi-statically configured mappings from PDCCH scheduling messages to CCs for data transmission: (a) without cross-carrier scheduling; and (b) with cross-carrier scheduling.

As mentioned previously, there are two types of scheduling policies defined for CA. FIG. 2 illustrates examples of semi-statically configured mappings from PDCCH scheduling messages to CCs for data transmission: (a) without cross-carrier scheduling; and (b) with cross-carrier scheduling. Note that in FIG. 2 five CCs, denoted CC1, CC2, CC3, CC4, and CC5, are assumed.

PDCCH is used to carry UL grants or DL resource assignments corresponding to physical uplink shared channel (PUSCH) or physical downlink shared channel (PDSCH) transmissions, respectively, on each CC. A PDCCH message on a given CC can schedule resources on the same CC (non-cross-carrier scheduling) or on a different CC (cross-carrier scheduling).

FIG. 2(a) illustrates the scenario of non-cross-carrier scheduling where a PDCCH on each downlink CC to carry DL resource assignments corresponding to PDSCH applicable to the same CC, and uplink resource grants corresponding to PUSCH applicable to the associated uplink CC (not shown).

FIG. 2(b) illustrates the scenario of cross-carrier scheduling where a PDCCH on one downlink CC may schedule data transmissions on one or more other CCs. Cross-carrier scheduling is supported for both DL resource assignments and UL grants. When UE is configured with cross-carrier scheduling, a 3-bit Carrier Indicator Field (CIF) is appended to the payload of PDCCH messages to identify the CC that corresponds to the resource grant/assignment contained in the PDCCH messages.

In the example shown in FIG. 2(b), the PDCCH on CC1 can schedule data transmissions on CC1, CC2 and CC3, while the PDCCH on CC5 can schedule data transmissions on CC4 and CC5.

Non-cross-carrier scheduling is suitable for scenarios where the UE can reliably receive PDCCH on all aggregated CCs. Cross-carrier scheduling is suitable when the UE is either not configured to receive the PDCCH or cannot reliably receive it on some CCs.

As viewed from above, in case of CA, there are multiple CCs and each DL CC can be configured as PCC for certain UE. It is necessary to define associated mechanism to notify the UE regarding the UL-DL configuration changes.

Figure 3:
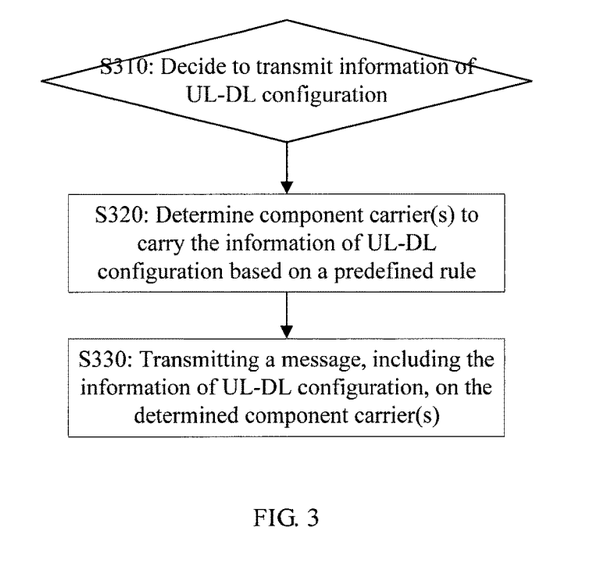
FIG. 3 illustrates an exemplary process flow of a method in a base station for signaling information of UL-DL configuration in presence of CA according to some embodiments.

FIG. 3 illustrates an exemplary process flow of a method in a base station for signaling information of UL-DL configuration in presence of CA according to some embodiments.

As shown in FIG. 3, at step S310, a base station may decide to transmit information of UL-DL configuration.

In one embodiment, the decision may be based on a predefined period (e.g., 10 ms) for notifying UL-DL configuration. In such embodiment, the base station could signal UL-DL configuration regularly, regardless whether a UL-DL configuration switch is needed.

In another embodiment, the decision may be based on a UL-DL configuration switch for any CC. For example, if a UL-DL configuration for some CC should be changed to match the instantaneous traffic situation, the base station could decide to signal information regarding the UL-DL configuration.

In a further embodiment, the above two embodiments could be combined. In such embodiment, in response to either the predefined period or the UL-DL configuration switch determination, the base station could decide to transmit information of UL-DL configuration.

It should be noted that, "UL-DL configuration" used herein could refer to both initial UL-DL configuration and UL-DL reconfiguration. The present disclosure has no limitation in this regard.

Having decided to transmit information of UL-DL configuration, then at step S320, the base station may determine one or more CCs to carry the information of UL-DL configuration based on a predefined rule. As described previously, in case of CA, there are multiple CCs and each downlink CC can be configured as PCC for certain UE. Thus, there are various schemes (i.e., rules) for determining the CC(s) for signaling the information of UL-DL configuration.

In a first embodiment, according a first rule (Rule A), the CCs that configured as the PCC for at least one active UE carry the information of UL-DL configuration. In some embodiments, the PCC of a certain UE is configured to carry the information of UL-DL configuration related to all serving CCs of that UE.

For example, in the scenario shown in FIG. 1, the PCC (e.g., CC1) of UE 101 may be configured to carry UL-DL configurations for its serving CCs, i.e., its PCC (CC1) and its SCC (CC0). Also, the PCC (e.g., CC2) of UE 102 may be configured to carry UL-DL configurations for its serving CCs, i.e., its PCC (CC2) and its SCC (CC0).

According to this embodiment, the UE only needs to monitor the information of UL-DL configuration over its PCC for all serving CCs and the information of UL-DL configuration of the CCs that are configured to serve the UEs should be transmitted over this carrier. The benefit of this embodiment is that the UE can monitor the information of UL-DL configuration of all serving CCs via one signal, and thus can save power consumption. In addition, since the PCC cannot be deactivated when UE is active, the information of UL-DL configuration is ensured to be transmitted.

In a second embodiment, according to a second rule (Rule B), the CCs which carry the downlink assignment and/or uplink grant (i.e., resource scheduling commands) carry the information of UL-DL configuration.

According to this embodiment, the UL-DL configurations of all CCs or all active CCs are only transmitted over the carriers that are configured to transmit the downlink assignment and or uplink grants (referred to as scheduling carrier or scheduling CC). In some embodiments, each scheduling carrier can be configured to carry the UL-DL configuration switch commands for the CCs whose downlink assignments or uplink grants are transmitted over this scheduling carrier (i.e., scheduled CCs). In other embodiments, a specified scheduling CC of a UE may be configured to carry the information of UL-DL configuration for all CCs. The specified scheduling CC can be either defined or configured in advance, or be configured through a signal upon transmission.

Take the example of FIG. 2(b) for illustration. In one embodiment, the scheduling carrier CC1 may be configured to carry UL-DL configurations for CC1, CC2, and CC3, and the scheduling carrier CC5 may be configured to carry UL-DL configurations for CC4 and CC5. Alternatively, the scheduling carrier CC1 is predefined or selected to carry UL-DL configurations for all the CCs, i.e., CC1-CC5.

The benefit of this second embodiment is that a UE only needs to monitor the information of UL-DL configuration over the scheduling CCs. Once a UE is configured with multiple scheduling CCs, it can be predefined which scheduling CC should carry the information of UL-DL configuration to save signal overhead and the UE power to monitor the information of UL-DL configuration.

In a third embodiment, according to a third rule (Rule C), each active CC may be configured to carry its own information of UL-DL configuration.

According to this embodiment, a UE needs to monitor the information of UL-DL configuration of each serving CC separately over the CC itself. The resulted power consumption for the UE employing multiple carriers can be high due that the UE may need to monitor multiple carriers. The benefit of this embodiment is that the information of UL-DL configuration transmission and monitoring is not affected by the carrier activation and deactivation. The disadvantage is that a UE has to monitor the information of UL-DL configuration over each serving CC.

In a fourth embodiment, according to a fourth rule (Rule D), a specified CC or a specified subset of CCs is configured to carry the information of UL-DL configuration.

According to this embodiment, it can be configured or predefined that certain CC carries the information of UL-DL configuration. As a first instance, it can be predefined that CC0 carries the information of UL-DL configuration of its own and other CCs. As a second instance, the CC that carries the information of UL-DL configuration can be configured by the system information and this CC carries the information of UL-DL configuration for all CCs.

As a third instance, a subset of CCs can be predefined or configured to carry the information of UL-DL configuration and each CC within the subset may be configured to carry the information of UL-DL configuration for a specified subset of CCs. Take the example of FIG. 2(b) for illustration where five CCs (CC1-CC5) are used for CA, the subset consisted of CC1 and CC5 may be predefined or configured to carry the information of UL-DL configuration. Specifically, CC1 may be configured to carry separate UL-DL configurations for CC1, CC2 and CC3 or a common UL-DL configuration for CC1, CC2, and CC3, whereas CC5 may be configured to carry separate UL-DL configurations for CC4 and CC5 or a common UL-DL configuration for CC4 and CC5. Deploying a common UL-DL configuration for a set of CCs is meaningful when some CCs are adjacent carriers and there can be adjacent carrier interference problem if these carriers are configured with different UL-DL configurations.

Return back to FIG. 3. Having determined the CC(s) to carry the information of UL-DL configuration, at step S330, the base station may transmit a message, including the information of UL-DL configuration, on the determined one or more CCs.

Depending on application scenarios, the message may contain different content.

In one embodiment, UL-DL configurations for CCs which are to switch UL-DL configuration are contained in the message. In other words, only new UL-DL configuration of a CC to which a UL-DL configuration change is configured is indicated to UE.

According to this embodiment, when there is any UL-DL configuration switch for certain CC, only the new UL-DL configuration of this CC is indicated to the relevant UEs while the UL-DL configurations of all other CCs without UL-DL configuration switch are not transmitted. This keeps the signaling overhead minimum.

In another embodiment, the message always contains UL-DL configurations for all CCs.

According to this embodiment, when there is UL-DL configuration switch for any CC, the new UL-DL configuration of this CC in addition to the UL-DL configurations of other CCs are indicated to the relevant UEs. Compared to the previous embodiment, the benefit of this embodiment is that a UE knows the current UL-DL configuration of all active CCs, which means the carrier activation/switching for a UE can be done fast since the UL-DL configurations of all CCs are known to the UE, which can further benefit the fast load sharing between carriers.

In a further embodiment, the message may contain one or more UL-DL configurations, each for a corresponding subset of CCs.

As a first instance, the message contains one UL-DL configuration for all CCs. In other words, all CCs are configured to a same UL-DL configuration and all CCs are treated as a whole at UL-DL configuration switch, i.e, all active CCs switch to the same new UL-DL configuration at UL-DL configuration switch. In such case, the eNB can just indicate a single new UL-DL configuration at UL-DL configuration switch. This method can clearly save the signaling overhead but block the opportunity that different CCs may be configured to different UL-DL configurations.

As a second instance, the message contains more than one UL-DL configurations, each for a corresponding subset of CCs. This embodiment is particularly beneficial to such case when some CCs are adjacent carriers and there can be adjacent carrier interference problem if these carriers are configured with different UL-DL configurations.

The message can be constructed in different forms.

Figure 4:
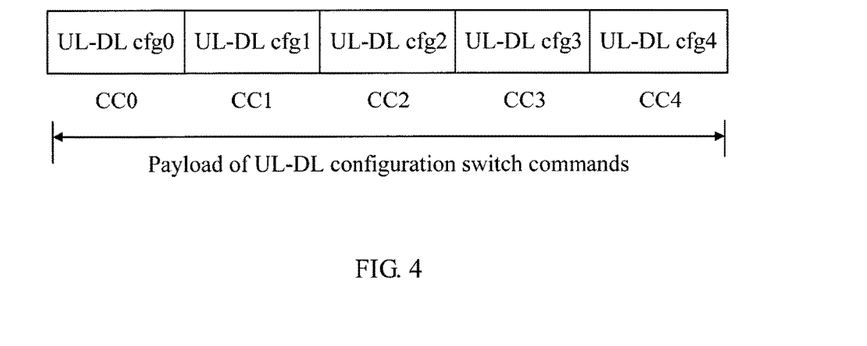
FIG. 4 illustrates an example of aggregated UL-DL configuration switch command for all active CCs according to one embodiment.

In one embodiment, the UL-DL configurations to be used for all involved CCs are aggregated into a single physical layer signaling or a UL-DL switch command.

FIG. 4 illustrates an example of aggregated UL-DL configuration switch command for all active CCs according to one embodiment.

In the example shown in FIG. 4, the UL-DL configurations of all CCs (UL-DL cfg0, . . . , UL-DL cfg4) are aggregated according to the carrier index (CC0, . . . , CC4). By this manner, a UE knows the UL-DL configurations of all CCs although only some of the CCs are configured to serve the UE. As mentioned above, it can provide the benefit of fast load sharing between carriers.

In another embodiment, the UL-DL configuration of each CC is carried by a separate command.

According to this embodiment, the UL-DL configuration switch command of each CC is transmitted by individual signaling. If the UL-DL configuration switch command is only transmitted over the primary carrier or scheduling carrier, a carrier indicator is needed to indicate which carrier is to switch the UL-DL configuration, and multiple commands are transmitted if multiple CCs switch UL-DL configuration.

Figure 5:
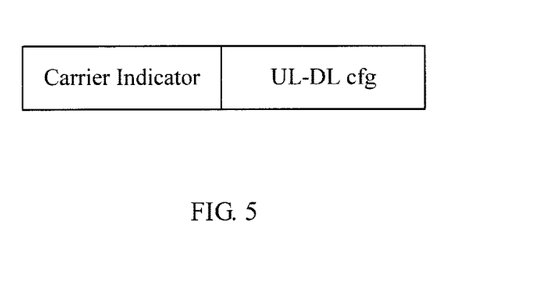
FIG. 5 illustrates an example of UL-DL configuration switch command for a single CC according to one embodiment.

FIG. 5 illustrates an example of UL-DL configuration switch command for a single CC according to one embodiment. As shown, the switch command contains a carrier indicator to indicate which carrier is to switch the UL-DL configuration, and a UL-DL configuration to indicate the UL-DL configuration for this CC.

In a further embodiment, one UL-DL configuration switch command can be applied to one or more CCs. That is, the message may contain one or more commands, each including one UL-DL configuration for a corresponding subset of CCs.

According to this embodiment, some of CCs can be predefined or configured as a set and the same UL-DL configuration is applied. Hence a same new UL-DL configuration is applied to all CCs within the set once the UL-DL configuration switch is triggered. This is meaningful when some CCs are adjacent carriers and there can be adjacent carrier interference problem if these carriers are configured with different UL-DL configurations. As a sub-embodiment, RRC signaling can be introduced to indicate the CC set configuration. As another sub-embodiment, it can be predefined that CCs with adjacent frequencies is a natural CC set.

The above thus has described exemplary methods for a base station to signal information of UL-DL configuration in presence of CA. It should be understood, all these embodiments are given merely for the skilled in the art to better understand and further practice the present disclosure, but not for limiting the scope of the present disclosure. For example, features illustrated or described as part of one embodiment may be used with another embodiment to yield still a further embodiment. For example, if the PCC of a UE is configured to carry the information of UL-DL configuration, and the information contains UL-DL configurations for all serving CCs, then it is possible for the PCC to carry a message aggregated with UL-DL configurations for all serving CCs. Alternatively, the PCC may carry a message consisted of a plurality of separate commands, each command for a UL-DL configuration of a corresponding CC among all the serving CCs. Apparently, those skilled in the art could envisage other embodiments under the inspiration of the present disclosure.

Figure 6:
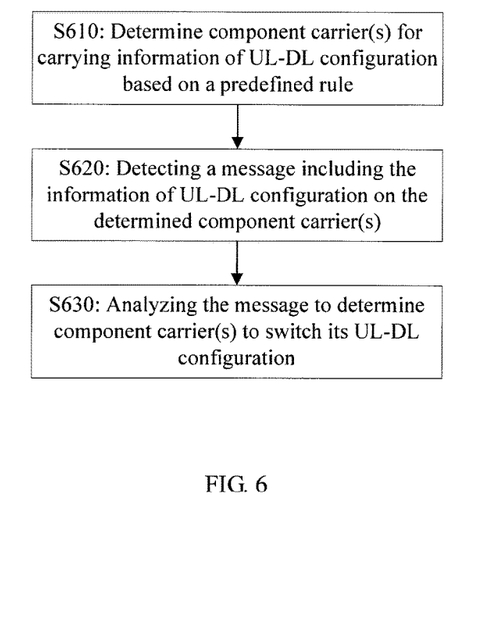
FIG. 6 illustrates an exemplary process flow of a method in a user equipment for receiving information of UL-DL configuration in presence of CA according to some embodiments.

FIG. 6 illustrates an exemplary process flow of a method in a user equipment for receiving information of UL-DL configuration in presence of CA according to some embodiments.

As shown in FIG. 6, at step S610, the user equipment determines one or more CCs for carrying the information of UL-DL configuration based on a predefined rule.

The predefined rule may comprise any of the following:

Rule A: configuring a PCC for a UE to carry the information of UL-DL configuration. The PCC of a UE may be configured to carry the information of UL-DL configuration related to all serving CCs of that UE.

Rule B: configuring scheduling CCs which carry resource scheduling commands (e.g., uplink grant and/or downlink assignment) to carry the information of UL-DL configuration. Each scheduling CC may be configured to carry the information of UL-DL configuration related to scheduled CC. Alternatively, a specified (predefined or configured) scheduling CC of a UE may be configured to carry the information of UL-DL configuration related to all CCs.

Rule C: configuring each active CC to carry its own information of UL-DL configuration.

Rule D: configuring a specified CC or specified subset of CCs to carry the information of UL-DL configuration. For example, the specified CC may be configured to carry the information of UL-DL configuration related to all CC. Alternatively, each CC within the specified subset of CCs may be configured to carry the information of UL-DL configuration related to a specified (predefined or configured) subset of CCs.

In some embodiments, the one or more CCs for signaling UL-DL configuration can be predefined for example according to any of the rules as described above. In some other embodiments, the one or more CCs for signaling UL-DL configuration can be configured based on the above rules by the eNB and notified to the UE through RRC signaling.

Then, the UE can monitor those CCs which may carry the information of UL-DL configuration. At step S620, the UE detects a message including the information of UL-DL configuration on the determined one or more CCs. The detection of a message is well known in the art, and thus the description thereof is omitted here.

At step S630, the UE can analyze the detected message and determine which CC(s) is/are to switch its/their UL-DL configuration(s).

As described with respect to FIG. 3, the message may comprise any one of the following: UL-DL configurations for CCs which are to switch UL-DL configuration; UL-DL configurations for all CCs; and one ore more UL-DL configurations, each for a corresponding subset of CCs. Also, the message may be formed by any of: a single command aggregated with UL-DL configurations related to all component carriers; a plurality of separate commands, each for the UL-DL configuration for one component carrier; and one or more commands, each including one UL-DL configuration for a corresponding subset of component carriers.

When the message contains only new UL-DL configuration(s) of CC(s) to which a UL-DL configuration change is configured, the message is preferably formed by separate commands, each for a new UL-DL configuration. Thus, the UE could identify the CC whose UL-DL configuration is to be switched through the carrier indicator included in the separate command. Then, the UE can switch the identified CC to the new UL-DL configuration.

Optionally, all the new UL-DL configurations may be aggregated into a single UL-DL configuration switch command. For example, a command comprising five fields is allocated for conveying UL-DL configuration for five CCs, such as the format shown in FIG. 4. In such case, if there are only 3 new UL-DL configurations to be notified, different coding schemes may be applied to introduce redundancy in order to occupy all the allocated fields, and thereby improving the signal to noise ratio (SNR).

Those skilled in the art could understand that, based on the CC(s) for signaling the information of UL-DL configuration and the content therein, other forms of UL-DL configuration switch command can be designed to convey the information of UL-DL configuration, and the present disclosure has no limitation in this regard.

Figure 7:
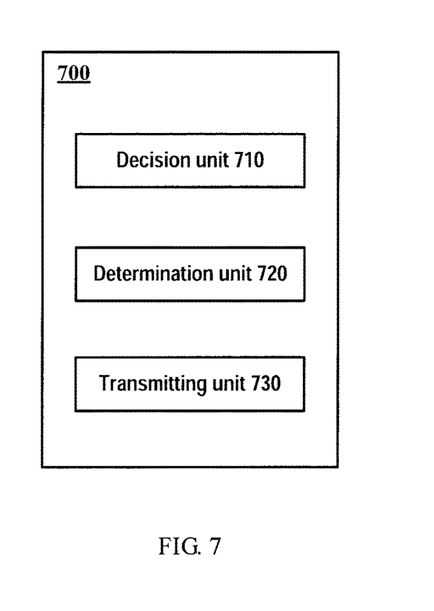
FIG. 7 is a schematic block diagram of a base station 700 that may be configured to practice exemplary embodiments according to some embodiments.

FIG. 7 is a schematic block diagram of a base station 700 that may be configured to practice exemplary embodiments according to some embodiments.

As shown in FIG. 7, the base station 700 may comprise a decision unit 710, a determination unit 720, and a transmitting unit 730.

The decision unit 710 may be configured to decide to transmit information of UL-DL configuration. In one embodiment, the decision may be based on a predefined period for notifying UL-DL configuration. In another embodiment, the decision may be based on a UL-DL configuration switch for any CC. In a further embodiment, the decision may be based on either the predefined period or the UL-DL configuration switch demand, whichever occurs earlier.

The determination unit 720 may be configured to determine one or more CCs to carry the information of UL-DL configuration based on a predefined rule. The predefined rule may comprise any of the rules as described above, and thus the detailed description thereof is omitted here.

The transmitting unit 730 may be configured to transmit a message, including the information of UL-DL configuration, on the determined one or more CCs.

Depending on application scenarios, the message may contain different content. For example, the message may contain any of the following: UL-DL configurations for CCs which are to switch UL-DL configuration; UL-DL configurations for all CCs; and one ore more UL-DL configurations, each for a corresponding subset of CCs. Also, the message may be formed by any of: a single command aggregated with UL-DL configurations related to all component carriers; a plurality of separate commands, each for the UL-DL configuration for one component carrier; and one or more commands, each including one UL-DL configuration for a corresponding subset of component carriers.

It should be understood, the units 710-730 contained in the base station 700 are configured for practicing exemplary embodiments herein. Thus, the operations and features described above with respect to FIG. 3 also apply to the apparatus 700 and the units therein, and the detailed description thereof is omitted here.

Figure 8:
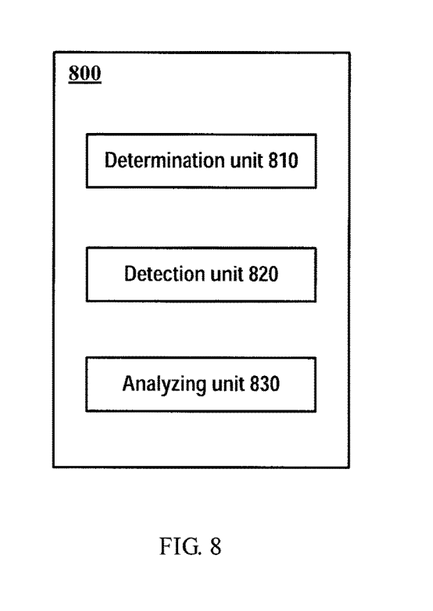
FIG. 8 is a schematic block diagram of a user equipment 800 that may be configured to practice exemplary embodiments according to some embodiments.

FIG. 8 is a schematic block diagram of a user equipment 800 that may be configured to practice exemplary embodiments according to some embodiments.

As shown in FIG. 8, the user equipment 800 may comprise a determination unit 810, a detection unit 820, and an analyzing unit 830.

The determination unit 810 may be configured to determine one or more CCs for carrying the information of UL-DL configuration based on a predefined rule. The predefined rule may comprise any of the above described rules (i.e., Rule A, Rule B, Rule C, and Rule D).

The detection unit 820 may be configured to detect a message including the information of UL-DL configuration on the determined one or more CCs.

The analyzing unit 830 may be configured to analyze the detected message and determine which CC(s) is/are to switch its/their UL-DL configuration(s).

As described above, the message may comprise any one of the following: UL-DL configurations for CCs which are to switch UL-DL configuration; UL-DL configurations for all CCs; and one ore more UL-DL configurations, each for a corresponding subset of CCs. Also, the message may be formed by any of: a single command aggregated with UL-DL configurations related to all component carriers; a plurality of separate commands, each for the UL-DL configuration for one component carrier; and one or more commands, each including one UL-DL configuration for a corresponding subset of component carriers.

It should be understood, the units 810-830 contained in the UE 800 are configured for practicing exemplary embodiments herein. Thus, the operations and features described above with respect to FIG. 6 also apply to the UE 800 and the units therein, and the detailed description thereof is omitted here.

In should be noted that FIGS. 7-8 merely illustrates various functional modules in the base station 700 and the wireless device 800 in a logical sense. The functions in practice may be implemented using any suitable software and hardware means/circuits etc. Thus, the embodiments are generally not limited to the shown structures of the base station 700 and the wireless device 800 and the functional modules. Hence, the previously described exemplary embodiments may be realized in many ways. For example, one embodiment includes a computer-readable medium having instructions stored thereon that are executable by the control or processing unit for executing the method steps in the base station 700 or in the wireless device 800. The instructions executable by the processing unit and stored on the computer-readable medium perform the method steps of the base station 700 or the wireless device 800 as set forth in the claims.

Figure 9:
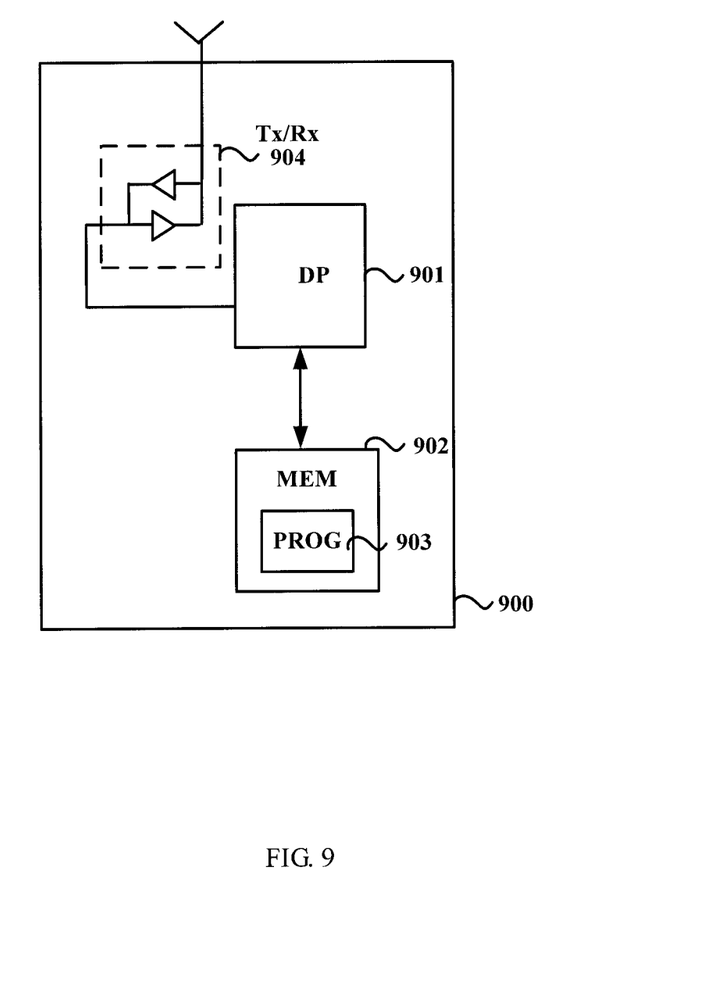
FIG. 9 illustrates a simplified block diagram of an entity 900 that is suitable for use in practicing exemplary embodiments herein.

FIG. 9 illustrates a simplified block diagram of an entity 900 that is suitable for use in practicing exemplary embodiments herein. The entity 900 may be an entity at the network side, for example, a base station, or an entity at the user side, e.g., a user equipment.

As shown in FIG. 9, the entity 900 includes a data processor (DP) 901, a memory (MEM) 902 coupled to the DP 901, and a suitable RF transmitter TX and receiver RX 904 coupled to the DP 901. The MEM 902 stores a program (PROG) 903. The TX/RX 904 is for bidirectional wireless communications. Note that the TX/RX 904 has at least one antenna to facilitate communication, though in practice a BS or a UE may have several ones. The entity 900 may be coupled via a data path to one or more external networks or systems, such as the internet, for example.

The PROG 903 is assumed to include program instructions that, when executed by the associated DP 901, enable the entity 900 to operate in accordance with the exemplary embodiments of this disclosure, as discussed herein with the methods in FIGS. 3 and 6. In some embodiments, when the entity 900 is configured as a base station, the memory of the base station contains instructions executable by the DP of the base station whereby the base station is operative to perform the method steps as illustrated in FIG. 3. In some other embodiments, when the entity 900 is configured as a wireless device, the memory of the wireless device contains instructions executable by the DP of the wireless device whereby the wireless device is operative to perform the method steps as illustrated in FIG. 6. In some other embodiments, when the entity 900 is a base station, the PROG 903 and the DP 901 may embody the decision unit 710 and the determination unit 720 to perform the respective functions. The TX/RX 904 may embody the transmitting unit 730 to perform the function of transmitting the message including information of UL-DL configuration. When the entity 900 is a wireless device or user equipment, the PROG 903 and the DP 901 may embody the determination unit 810 and the analyzing unit 830 to perform the respective functions. The TX/RX 904, the PROG 903, and the DP 901 PROG may work together to embody the detecting unit 820 to detect a message including the information of UL-DL configuration on the determined one or more CC.

The embodiments herein may be implemented by computer software executable by the DP 901 of the entity 900, or by hardware, or by a combination of software and hardware.

The MEM 902 may be of any type suitable to the local technical environment and may be implemented using any suitable data storage technology, such as semiconductor based memory devices, magnetic memory devices and systems, optical memory devices and systems, fixed memory and removable memory, as non-limiting examples. While only one MEM is shown in the entity 900, there may be several physically distinct memory units in the entity 900. The DP 901 may be of any type suitable to the local technical environment, and may include one or more of general purpose computers, special purpose computers, microprocessors, digital signal processors (DSPs) and processors based on multicore processor architecture, as non limiting examples. The entity 900 may have multiple processors, such as for example an application specific integrated circuit chip that is slaved in time to a clock which synchronizes the main processor.

Thus, the present disclosure provides a BS which is adapted for transmitting information of uplink-downlink, UL-DL, configuration in presence of carrier aggregation. The BS comprises processing means adapted to perform any method steps according to aspects of embodiments of the present disclosure. In some embodiments, the processing means of the BS is configured to perform the method steps as illustrated in FIG. 3. Also, a wireless device adapted for receiving information of uplink-downlink, UL-DL, configuration in presence of carrier aggregation is provided. The wireless device comprises processing means adapted to perform any method steps according to aspects of embodiments of the present disclosure. In some embodiments, the processing means of the wireless device is configured to perform the method steps as illustrated in FIG. 6. In some embodiments, the processing means comprises at least a processor and at least a memory, the memory containing instructions executable by the processor.

Exemplary embodiments herein have been described above with reference to block diagrams and flowchart illustrations of methods, apparatuses (i.e., systems). It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

The foregoing computer program instructions can be, for example, sub-routines and/or functions. A computer program product in one embodiment comprises at least one computer readable storage medium, on which the foregoing computer program instructions are stored. The computer readable storage medium can be, for example, an optical compact disk or an electronic memory device like a RAM (random access memory) or a ROM (read only memory).

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It should also be noted that the above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims. In addition, any of the reference numerals in the claims should not be interpreted as a limitation to the claims. Use of the verb "comprise" and its conjugations does not exclude the presence of elements or steps other than those stated in a claim. The indefinite article "a" or "an" preceding an element or step does not exclude the presence of a plurality of such elements or steps.

What is claimed is:

1. A method in a base station for transmitting information of uplink-downlink, UL-DL, configuration in presence of carrier aggregation, said method comprising:
   in response to a decision of transmitting the information of UL-DL configuration to a wireless device, determining one or more component carriers, from a plurality of component carriers configured for the wireless device, to carry the information of UL-DL configuration based on a predefined rule; and
   transmitting a message, including the information of UL-DL configuration, to the wireless device on the determined one or more component carriers, the message comprising an UL-DL configuration switch command, the switch command indicating that a subset of the plurality of component carriers configured for the wireless device are to switch UL-DL configuration and comprising an indication of an UL-DL configuration for the subset of the plurality of component carriers configured for the wireless device, wherein the subset of the plurality of component carriers configured for the wireless device comprises at least two component carriers.

2. The method of claim 1, wherein said predefined rule comprises one or more of the following:
   rule A: a primary component carrier, PCC, for a user equipment, UE, is configured to carry the information of UL-DL configuration;
   rule B: scheduling component carriers which carry resource scheduling commands are configured to carry the information of UL-DL configuration;
   rule C: each active component carrier is configured to carry its own information of UL-DL configuration; and
   rule D: a specified component carrier or a specified subset of component carriers is configured to carry the information of UL-DL configuration.

3. The method of claim 2, wherein:
   in rule A, said PCC of a user equipment is configured to carry the information of UL-DL configuration related to all serving component carriers of the user equipment;
   in rule B, said scheduling component carrier is configured to carry the information of UL-DL configuration related to scheduled component carriers, or a specified scheduling component carrier of a UE is configured to carry the information of UL-DL configuration related to all component carriers; and
   in rule D, said specified component carrier is configured to carry the information of UL-DL configuration related to all component carriers, or each component carrier within the specified subset is configured to carry the information of UL-DL configuration related to a specified subset of component carriers.

4. The method of claim 1, wherein said message comprises any one of the following:
   UL-DL configurations for component carriers which are to switch UL-DL configuration;
   UL-DL configurations for all component carriers; and
   one or more UL-DL configurations, each for a corresponding subset of component carriers.

5. The method of claim 1, wherein said message comprises any of:
   a single command aggregated with UL-DL configurations related to all component carriers; and
   a plurality of separate commands, each for the UL-DL configuration for one component carrier.

6. The method of claim 1, wherein said decision is made based on one or more of the following:
   a UL-DL configuration switch for any component carrier; and
   a period for notifying UL-DL configuration.

7. A computer program product, comprising a non-transitory computer-readable storage medium, the non-transitory computer readable storage medium having a computer program comprising computer-executable instructions which, when executed on at least one processor, are configured to cause the at least one processor to perform the method according to claim 1.

8. A method in a wireless device for receiving information of uplink-downlink, UL-DL, configuration in presence of carrier aggregation, said method comprising:
   determining one or more component carriers, from a plurality of component carriers configured for the wireless device, for carrying the information of UL-DL configuration based on a predefined rule;
   detecting a message including said information of UL-DL configuration on said one or more component carriers, the message comprising an UL-DL configuration switch command, the switch command indicating that a subset of the plurality of component carriers configured for the wireless device are to switch UL-DL configuration and comprising an indication of an UL-DL configuration for the subset of the plurality of component carriers configured for the wireless device, wherein the subset of the plurality of component carriers configured for the wireless device comprises at least two component carriers; and
   analyzing said message to determine the subset of the plurality of component carriers to switch their UL-DL configuration.

9. The method of claim 8, wherein said predefined rule comprises one or more of the following:
   rule A: a primary component carrier, PCC, for a user equipment, UE, is configured to carry the information of UL-DL configuration;
   rule B: scheduling component carriers which carry resource scheduling commands are configured to carry the information of UL-DL configuration;

rule C: each active component carrier is configured to carry its own information of UL-DL configuration; and rule D: a specified component carrier or a specified subset of component carriers is configured to carry the information of UL-DL configuration.

10. The method of claim 9, wherein:

in rule A, said PCC of a user equipment is configured to carry the information of UL-DL configuration related to all serving component carriers of the user equipment;

in rule B, said scheduling component carrier is configured to carry the information of UL-DL configuration related to scheduled component carriers, or a specified scheduling component carrier of a UE is configured to carry the information of UL-DL configuration related to all component carriers; and in rule D, said specified component carrier is configured to carry the information of UL-DL configuration related to all component carriers, or each component carrier within the specified subset is configured to carry the information of UL-DL configuration related to a specified subset of component carriers.

11. The method of claim 8, wherein said message comprises any one of the following:

UL-DL configurations for component carriers which are to switch UL-DL configuration;

UL-DL configurations for all component carriers; and one or more UL-DL configurations, each for a corresponding subset of component carriers.

12. The method of claim 8, wherein said message comprises any of:

a single command aggregated with UL-DL configurations related to all component carriers; and a plurality of separate commands, each for the UL-DL configuration for one component carrier.

13. A base station adapted for transmitting information of uplink-downlink, UL-DL, configuration in presence of carrier aggregation, comprising a processor and a memory, said memory containing instructions executable by said processor whereby said base station is operative to:

in response to a decision of transmitting the information of UL-DL configuration to a wireless device, determining one or more component carriers, from a plurality of component carriers configured for the wireless device, to carry the information of UL-DL configuration based on a predefined rule; and transmitting a message, including the information of UL-DL configuration, to the wireless device on the determined one or more component carriers, the message comprising an UL-DL configuration switch command, the switch command indicating that a subset of the plurality of component carriers configured for the wireless device are to switch UL-DL configuration and comprising an indication of an UL-DL configuration for the subset of the plurality of component carriers configured for the wireless device, wherein the subset of the plurality of component carriers configured for the wireless device comprises at least two component carriers.

14. The base station of claim 13, wherein said predefined rule comprises one or more of the following:

rule A: a primary component carrier, PCC, for a user equipment, UE, is configured to carry the information of UL-DL configuration;

rule B: scheduling component carriers which carry resource scheduling commands are configured to carry the information of UL-DL configuration;

rule C: each active component carrier is configured to carry its own information of UL-DL configuration; and rule D: a specified component carrier or a specified subset of component carriers is configured to carry the information of UL-DL configuration.

15. The base station of claim 13, wherein said message comprises any one of the following:

UL-DL configurations for component carriers which are to switch UL-DL configuration;

UL-DL configurations for all component carriers; and one or more UL-DL configurations, each for a corresponding subset of component carriers.

16. The base station of claim 13, wherein said message comprises any of:

a single command aggregated with UL-DL configurations related to all component carriers; and a plurality of separate commands, each for the UL-DL configuration for one component carrier.

17. A wireless device adapted for receiving information of uplink-downlink, UL-DL, configuration in presence of carrier aggregation, comprising a processor and a memory, said memory containing instructions executable by said processor whereby said wireless device is operative to:

determine one or more component carriers, from a plurality of component carriers configured for the wireless device, for carrying the information of UL-DL configuration based on a predefined rule;

detect a message including said information of UL-DL configuration on said one or more component carriers, the message comprising an UL-DL configuration switch command, the switch command indicating that a subset of the plurality of component carriers configured for the wireless device are to switch UL-DL configuration and comprising an indication of an UL-DL configuration for the subset of the plurality of component carriers configured for the wireless device, wherein the subset of the plurality of component carriers configured for the wireless device comprises at least two component carriers; and analyze said message to determine the subset of the plurality of component carriers to switch their UL-DL configuration.

18. The wireless device of claim 17, wherein said predefined rule comprises one or more of the following:

rule A: a primary component carrier, PCC, for a user equipment, UE, is configured to carry the information of UL-DL configuration;

rule B: scheduling component carriers which carry resource scheduling commands are configured to carry the information of UL-DL configuration;

rule C: each active component carrier is configured to carry its own information of UL-DL configuration; and rule D: a specified component carrier or a specified subset of component carriers is configured to carry the information of UL-DL configuration.

19. The wireless device of claim 17, wherein said message comprises any one of the following:

UL-DL configurations for component carriers which are to switch UL-DL configuration;

UL-DL configurations for all component carriers; and one or more UL-DL configurations, each for a corresponding subset of component carriers.

20. The wireless device of claim 17, wherein said message comprises any of:
- a single command aggregated with UL-DL configurations related to all component carriers; and
- a plurality of separate commands, each for the UL-DL configuration for one component carrier.

* * * * *

UNITED STATES PATENT AND TRADEMARK OFFICE
CERTIFICATE OF CORRECTION

PATENT NO. : 10,154,491 B2
APPLICATION NO. : 14/911047
DATED : December 11, 2018
INVENTOR(S) : Fan et al.

Page 1 of 1

It is certified that error appears in the above-identified patent and that said Letters Patent is hereby corrected as shown below:

In the Drawings

In Fig. 2, Sheet 1 of 4, delete " 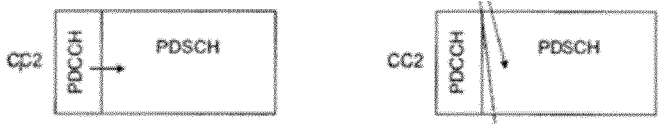 " and insert 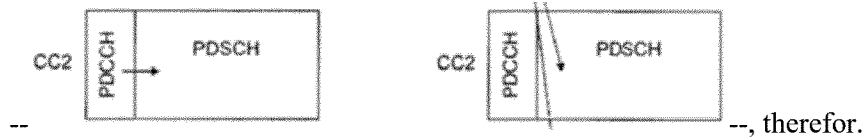 --, therefor.

In the Specification

In Column 7, Line 46, delete "according a" and insert -- according to a --, therefor.

In Column 8, Line 8, delete "and or" and insert -- and/or --, therefor.

In Column 11, Line 37, delete "ore" and insert -- or --, therefor.

In Column 12, Line 28, delete "ore" and insert -- or --, therefor.

In Column 12, Line 62, delete "ore" and insert -- or --, therefor.

In Column 13, Line 9, delete "In should" and insert -- It should --, therefor.

In Column 13, Line 9, delete "FIGS. 7-8 merely illustrates" and insert -- FIGS. 7-8 merely illustrate --, therefor.

In Column 13, Line 64, delete "DP 901 PROG" and insert -- DP 901 --, therefor.

Signed and Sealed this
Twenty-sixth Day of March, 2019

Andrei Iancu
*Director of the United States Patent and Trademark Office*